United States Patent
Ruthinowski et al.

(10) Patent No.: US 7,681,911 B2
(45) Date of Patent: Mar. 23, 2010

(54) SERVICEABLE ASSEMBLY FOR SEATBELT INTEGRATED DEPLOYABLE CUSHION

(75) Inventors: Richard Edward Ruthinowski, Taylor, MI (US); Brian Robert Spahn, Plymouth, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/119,592

(22) Filed: May 13, 2008

(65) Prior Publication Data

US 2009/0283994 A1 Nov. 19, 2009

(51) Int. Cl.
*B60R 21/18* (2006.01)
(52) U.S. Cl. .................................... 280/733
(58) Field of Classification Search ............ 280/733, 280/804, 801.1, 808; 297/468
See application file for complete search history.

(56) References Cited

U.S. PATENT DOCUMENTS

| | | | |
|---|---|---|---|
| 3,866,940 A * | 2/1975 | Lewis | 280/733 |
| 3,933,370 A * | 1/1976 | Abe et al. | 280/733 |
| 5,062,662 A * | 11/1991 | Cameron | 280/733 |
| 5,288,104 A | 2/1994 | Chen | |
| 5,511,820 A | 4/1996 | Hatfield | |
| 5,597,178 A * | 1/1997 | Hardin, Jr. | 280/733 |
| 5,642,902 A | 7/1997 | France | |
| 5,863,065 A * | 1/1999 | Boydston et al. | 280/733 |
| 5,924,726 A | 7/1999 | Pan | |
| 6,189,921 B1 | 2/2001 | Takeuchi | |
| 6,276,715 B1 * | 8/2001 | Takeuchi | 280/733 |
| 6,293,582 B1 * | 9/2001 | Lewis | 280/735 |
| 6,325,412 B1 | 12/2001 | Pan | |
| 6,352,282 B2 | 3/2002 | Hirose | |
| 6,378,898 B1 * | 4/2002 | Lewis et al. | 280/733 |
| 6,523,856 B2 * | 2/2003 | Braun et al. | 280/733 |
| 6,692,020 B2 * | 2/2004 | Decomps et al. | 280/733 |

(Continued)

*Primary Examiner*—Paul N Dickson
*Assistant Examiner*—Robert A Coker
(74) *Attorney, Agent, or Firm*—Shook, Hardy & Bacon LLP (57) ABSTRACT

A serviceable seatbelt integrated airbag assembly that is removably attached to a vehicle seat includes an integrated deployable cushion, an inflation device, and a lap belt portion. A bracket may be provided that is removably attached to the seat. The lap belt portion is generally removably attached to the seat structure through connection with a bracket or structural member of the seat assembly and secured by a removable fastener. The airbag cushion is attached to, or contained within, a portion of the lap belt portion seatbelt webbing. An end of the lap belt portion fits through an interfacing joint element attached to one end of the primary seatbelt webbing. The airbag inflation device is connected to the electrical system of the vehicle. Removal of the serviceable seatbelt integrated airbag assembly is accomplished by disconnecting the electrical connector from the electrical system of the vehicle and seatbelt integrated airbag lap belt portion. The removable fastener is removed to disengage the lap belt portion from connection with the seat assembly and the lap belt portion is then released from connection with the primary seatbelt assembly by feeding an end of the lap belt portion through the interfacing joint element Attachment of the serviceable assembly is accomplished by reversing the described steps. Removal of the remaining portion of the seatbelt system, including the retractor and upper seatbelt guide may be achieved after decoupling the seatbelt integrated airbag lap belt portion from the seat structure and primary seatbelt system.

19 Claims, 7 Drawing Sheets

U.S. PATENT DOCUMENTS

| | | | |
|---|---|---|---|
| 7,434,833 B2 * | 10/2008 | Kore | 280/733 |
| 2002/0011723 A1 * | 1/2002 | Lewis | 280/735 |
| 2005/0189749 A1 | 9/2005 | Itaoga et al. | |
| 2007/0063493 A1 * | 3/2007 | Higuchi et al. | 280/733 |

* cited by examiner

SERVICEABLE ASSEMBLY FOR SEATBELT INTEGRATED DEPLOYABLE CUSHION

TECHNICAL FIELD

A serviceable seatbelt integrated deployable cushion assembly is provided for use in relation to a vehicle seat and a primary seatbelt assembly. Particularly, a serviceable seatbelt integrated deployable cushion assembly is provided which can be decoupled from a primary seatbelt assembly, readily removed and replaced without the need for removing components of the primary seatbelt assembly such as the retractable seatbelt webbing, d-ring (or belt guide loop or retaining guide), retractor assembly, pyrotechnic belt tensioning device (if equipped) or the mounting hardware associated with the primary seatbelt, or removing seat or interior trim (or shields/covers) through which the primary seatbelt passes or with which it may be in contact. Similarly, the primary seatbelt assembly, which includes the primary seatbelt, d-ring, retractor assembly, pyrotechnic belt tensioning device (if equipped) and primary seatbelt assembly mounting hardware, may also be independently serviced by decoupling and removing the seatbelt integrated deployable cushion assembly from the engagement with the primary seat belt assembly. Upon completion of service to, or replacement of, the primary seatbelt assembly or its components, the seatbelt integrated deployable cushion assembly may be reinstalled. The serviceable seatbelt integrated deployable cushion assembly includes a lap belt portion having an integrated deployable cushion, an inflation device, and may include various functional hardware components that enable attachment to the seat structure, vehicle structure, primary vehicle assembly or to the primary seatbelt assembly and/or enhance functional performance. Depending upon the embodiment, the serviceable seatbelt integrated deployable cushion assembly may or may not include a bracket removably attached to the seat.

BACKGROUND OF THE INVENTION

It is well known to provide occupant restraint systems for vehicles, such as passenger cars, to restrain the occupant during an impact event. Typically, an occupant restraint subsystem includes a seatbelt assembly, a seatbelt or buckle mounted pyrotechnic belt tensioning device, one or more airbag cushions (also known as a deployable cushion, inflatable chamber or a gas bag), one or more inflation devices (such as an inflator, a micro gas generator [MGG], and the like) for inflating the airbag cushion(s) and functional hardware components that enable attachment of the deployable device(s) to the seat structure or seatbelt assembly and/or to enhance functional performance. During an impact of predetermined severity, a restraint control module signals the pyrotechnic belt tensioning device (if so equipped), and/or the inflation device(s) used to inflate the airbag cushion(s) to protect the occupant.

The incorporation of side impact airbags in vehicle restraint systems has become increasingly common in recent years. Such airbags are typically mounted within the seat assembly, the vehicle's door, or to a side body support or similar structural member of the vehicle.

Side, frontal and angular impact protection may also be achieved or supplemented through inclusion of an airbag cushion configuration that is integrated with, or attached to, the seatbelt assembly. The deployable cushion can be configured to inflate to offer impact protection and/or seatbelt tensioning in a side, angular or frontal collision. Currently in the art, servicing a seatbelt integrated airbag assembly requires removal of the entire combined bag-in-belt system, including the full length of the seatbelt, the retractor assembly and upper belt retaining guide (or d-ring) assembly, seatbelt mounted pyrotechnic belt tensioning device (if equipped), attaching hardware and the deployable cushion and its inflation device, mounting hardware and other functional components. In the event that there is a need to remove or replace only the seatbelt integrated airbag assembly or only the primary seatbelt assembly to perform service to address a customer need, electrical or mechanical fault, etc., removal of the entire combined cushion, inflation device, seatbelt, retractor, d-ring assembly, seatbelt belt mounted pyrotechnic belt tensioning device (if equipped), mounting and functional performance hardware, is required in current designs. Removal of the entire combined deployable cushion, seatbelt and belt tensioning system is needed as the individual components of the assembly cannot be decoupled from one another currently in the art. It is additionally often necessary to remove interior trim behind which such seatbelt assembly content as the retractor is often mounted, whether mounted to a seat assembly or structural member of the vehicle. These steps are often cumbersome and require considerable material cost, service time and labor expense, and are likely to result in customer dissatisfaction related to the increased costs and increased likelihood of resultant degradation in interior appearance or interior quietness as byproducts of any service exercise.

Accordingly, a need exists today for a seatbelt integrated airbag assembly that allows for the deployable airbag portion of the assembly to be decoupled from the primary seatbelt, d-ring, retractor and as-equipped belt tensioning device portion of the system so each assembled portion may be readily and efficiently serviced or replaced, independent of one another.

SUMMARY OF THE INVENTION

The disclosed embodiments of the invention provide a serviceable seatbelt integrated deployable cushion assembly that is removably attached to any of a variety of seats fitted to a vehicle, such as an automobile, a commercial vehicle, an airplane, a boat or a train. The serviceable seatbelt integrated airbag assembly thus has utility with any seat where seatbelts are, or could be, used. The disclosed embodiments of the invention provide an efficient way to reduce costs by enabling independent removal and servicing of the seatbelt integrated deployable cushion assembly (and its inflation device, as necessary) associated with a vehicle seat and its primary seatbelt, d-ring, pyrotechnic seatbelt tensioning device (as equipped) and retractor assemblies. Similarly, the enclosed embodiments provide a means of independently servicing the primary seatbelt assembly, including the seatbelt webbing, d-ring, pyrotechnic seatbelt tensioning device (as equipped) and retractor assemblies by decoupling and removing the seatbelt integrated deployable cushion assembly (and its inflation device, as necessary) to perform the necessary service or replacement actions, subsequently reinstalling the same deployable cushion assembly (and its inflation device, if removed).

The serviceable seatbelt integrated deployable cushion assembly is provided in several embodiments. In the first embodiment the serviceable assembly comprises a bracket which may or may not include a removably attached deployable cushion inflation device, the bracket being generally removably attached to the seat, vehicle structure, or to a nearby member of the vehicle floor, and a lap belt portion having an integrated deployable cushion, the lap belt portion having one end fixedly attached to the bracket and another end releasably attached to the bracket. An inflation device may be attached to the bracket or may be provided in another location on the seat. The lap belt portion fixedly attached to the bracket may instead be directly fixedly attached to a structural feature on the seat assembly that may be readily interchanged, such as a frame member, stanchion, riser, seat track assembly, etc. while the inflation device may be affixed, integral to, or in close proximity to, either the fixedly or releasably attached end or at a satellite location on the seat. The inflation device fills the inflatable cushion directly or by means of a mechanism such as a fluid line or fill tube. In the second embodiment the serviceable assembly comprises a lap belt portion having an integrated deployable cushion. Both ends of the lap belt portion are removably attached to the seat, vehicle structure, or to a nearby member of the vehicle floor. The inflation device may be affixed integral to, or in close proximity to, either a releasably attached end of the lap belt portion or at a satellite location on the seat. The inflation device fills the inflatable cushion directly or by means of a mechanism such as a fluid line or fill tube and may be affixed, integral to, or in close proximity to, an end of the lap belt portion or at a satellite location on the seat as dictated by package, performance and similar development, assembly and customer requirements. Both embodiments are releasably attached to the primary seatbelt webbing through connection with the interfacing joint element that is affixed to one end of the primary seatbelt webbing.

Removal of the serviceable seatbelt integrated deployable cushion assembly of the first embodiment is accomplished by the following general steps. If covered by a vehicle seats decorative trim cover, side shield or other interior trim covering, such a covering would be removed to gain access to the releasable ends of the lap belt portion and associated fasteners or attachment hardware. Whether fitted to a bracket, a structural seat member or attached to, or integrated within the lab belt portion, the inflation device is disconnected from the vehicle electrical system. When the inflation device is connected to the deployable cushion by a fluid line, rather than being directly connected, the fluid line engagement may be disconnected, as necessary. An end of the lap belt releasably attached to the bracket or structural member of the seat, vehicle structure, or to a nearby member of the vehicle floor, is then disengaged after removing the attachment fasteners and the free end is passed through the interfacing lap belt joining element or structure provided on the primary seat belt. Reattachment of the serviceable seatbelt integrated deployable cushion assembly is accomplished in reverse order. The order of steps taken for disassembly and reinstallation may vary among users. Once removed, the seatbelt integrated deployable cushion assembly (and its inflation device as applicable) may be serviced or the primary seatbelt, d-ring, belt tensioning device (if equipped), retractor assemblies and mounting hardware may be removed for independent service or replacement.

This invention thus overcomes the problems of the known art by providing an efficient and effective means of readily decoupling, removing and re-attaching independently serviceable assemblies. As such, service labor efficiencies are achieved and removal and replacement costs are reduced substantially by eliminating unnecessary, expensive, time-intensive removal of the entire combined system to address the individual service or replacement needs of one portion or the other. Other features of the invention will become apparent when viewed in light of the detailed description of the preferred embodiment and when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described various embodiments. These specific parameters and components are included as examples and are not meant to be limiting.

Figure 1:
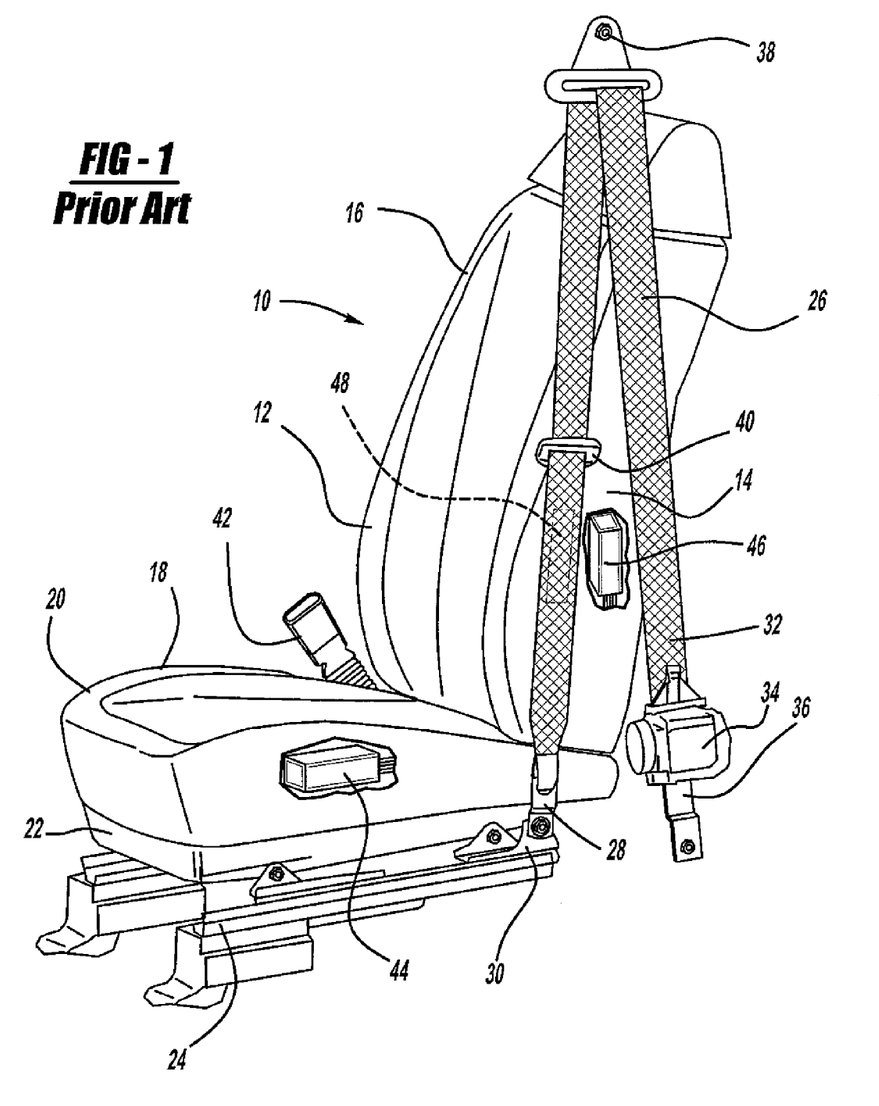
FIG. 1 illustrates a perspective view of a vehicle seat and seatbelt arrangement according to the prior art.

With respect to FIG. 1, a seat arrangement according to the prior art, generally illustrated as 10, is illustrated in a perspective view. The seat 10 is of the type generally found in passenger and commercial vehicles, although the seat 10 could be of any of a variety of seats provided in any vehicle transporting people by air, sea or land, such as an airplane, any of a variety of watercraft, a bus, a train, and so forth. The seat 10 has an inboard side 12 and an outboard side 14, with the outboard side 14 generally being adjacent to the vehicle door (not shown) and/or facing the exterior of the vehicle, particularly in the case of an automobile. For other vehicle types, multiple seats may exist in a single row of seating. Few or no seats in a given row may be located adjacent to a door or an exit point for various vehicle types.

The seat 10 includes a generally upright seat back 16 and a generally horizontal seat base 18. The seat base 18 includes an upper portion 20 and a lower portion 22. The lower portion 22 generally rests on and may be fixedly or removably attached to a seat structure, frame or track assembly 24 which itself rests on and is fixedly attached to such content as stanchions, risers or other interfacing components being directly attached to the vehicle floor (not shown). In some instances, the lower portion 22 may also rest directly on, and be attached to, the floor pan or similar structure in a vehicle (not shown).

The seat 10 of the prior art as illustrated is associated with a seatbelt assembly which includes a belt integrated deployable cushion 48 to protect and cushion the seated occupant during an impact event or offer belt tensioning through expansion of the airbag cushion upon deployment. The seatbelt assembly associated with the vehicle seat 10 includes a seatbelt 26 having a first end 28 that is generally removably attached to a bracket 30, secured by a fastener 31. The bracket 30 may be fixed to, or attached to, or an integral extension of, the seat structure, frame or track assembly 24. In other possible vehicle configurations the first end 28 may be connected directly to the seat structure, frame or track assembly 24, or to a floor pan or similar structure in a vehicle.

The seatbelt 26 includes a second end 32 that is operatively associated with a retractor assembly 34. (Non-automotive vehicle configurations may be comprised of a second end 32 that is not operatively associated with a retractor assembly.) The retractor assembly 34 is generally releasably attached to a pillar, column, wall or similar structural member of the vehicle (not shown) by a fastener (not shown) engaging a bracket 36 that may be fixedly attached to the retractor assembly 34, or an extension of the retractor assembly 34. The seatbelt 26 is also routed through an upper seatbelt retaining bracket guide 38, commonly referred to as a d-ring, generally located and attached to the vehicle structure by a fastener near the roof of the vehicle (not shown). While not depicted in the figures, the retractor assembly 34 may be alternatively affixed directly to the seat 10, or attached to seat 10 through engagement with bracket 36, in association with a seatbelt retaining guide that may be an integral feature of the retractor assembly or a component of the seat assembly, for example, in the case of seat integrated restraint (SIR) designs known in the art (not shown). To buckle the seatbelt 26 substantially around the seated occupant, the tongue element of a tongue assembly 40 is slidably fitted on the seatbelt 26. The tongue assembly 40 is releasably attachable to a buckle assembly 42 which is conventionally provided adjacent to the inboard side 12 of the seat 10, particularly in automotive applications.

The seat 10 of FIG. 1 may be modified to include one or more airbag inflation devices affixed to the seat structure, frame, or track assembly 24. As is known in the art, the seat 10 of FIG. 1 may be further modified to include one or more airbags in a variety of possible combinations, each operatively associated with the seat 10. As illustrated, an airbag 44 may be fitted to deploy from the seat base 18 and/or an airbag 46 may be fitted to deploy from the seat back 16. Airbags may also be affixed to, and/or deploy from the vehicle door, pillar or other structural or load bearing vehicle component or assembly (not shown). In addition, as is also known in the art, a deployable cushion 48 may be attached to the seatbelt 26, with its associated inflation device (not shown) being contained within, or fitted external to, the webbing of seatbelt 26, located in close proximity to the deployable cushion 48, or at a satellite location within the seat 10; the inflation device filling the inflatable cushion directly or by means of a mechanism such as a fluid line or fill tube (not shown). Each of the airbags 44, 46, 48 includes, or is associated with, an airbag inflation device (no shown) as is known in the art.

According to such an arrangement, in the event that such items as the deployable cushion 48, its associated inflation device (not shown), the d-ring assembly 38, the seatbelt 26, the retractor assembly 34, or the pyrotechnic belt tensioning device (not shown) require servicing, it would be necessary for the service technician to remove the seat side shield or similar applicable seat mounted interior protective/decorative trim (not shown), detach the first end 28 from connection with the bracket 30, detach the retractor assembly 34 from the vehicle column or wall, or from the seat assembly for SIR type seats (as applicable) by disengaging the connection through bracket 36, and detach the upper seatbelt retaining bracket 38 from the upper vehicle structure (not shown). Additionally, applicable interior trim (not shown) covering the second end 32, the retractor assembly 34, the bracket 36 and some portion of the seatbelt 26 would also need to be removed to access the fastener(s) securing bracket 36 to the vehicle structure or seat structure (as applicable), thus freeing the seatbelt 26, d-ring assembly 38, retractor assembly 34, and pyrotechnic belt tensioning device (if equipped, not shown) and the associated airbag components from the vehicle. Re-attachment of the seatbelt 26, d-ring assembly 38, retractor assembly 34, and pyrotechnic belt tensioning device (if equipped) and the associated airbag components to the vehicle would be undertaken in steps opposite those listed above.

Figure 8:
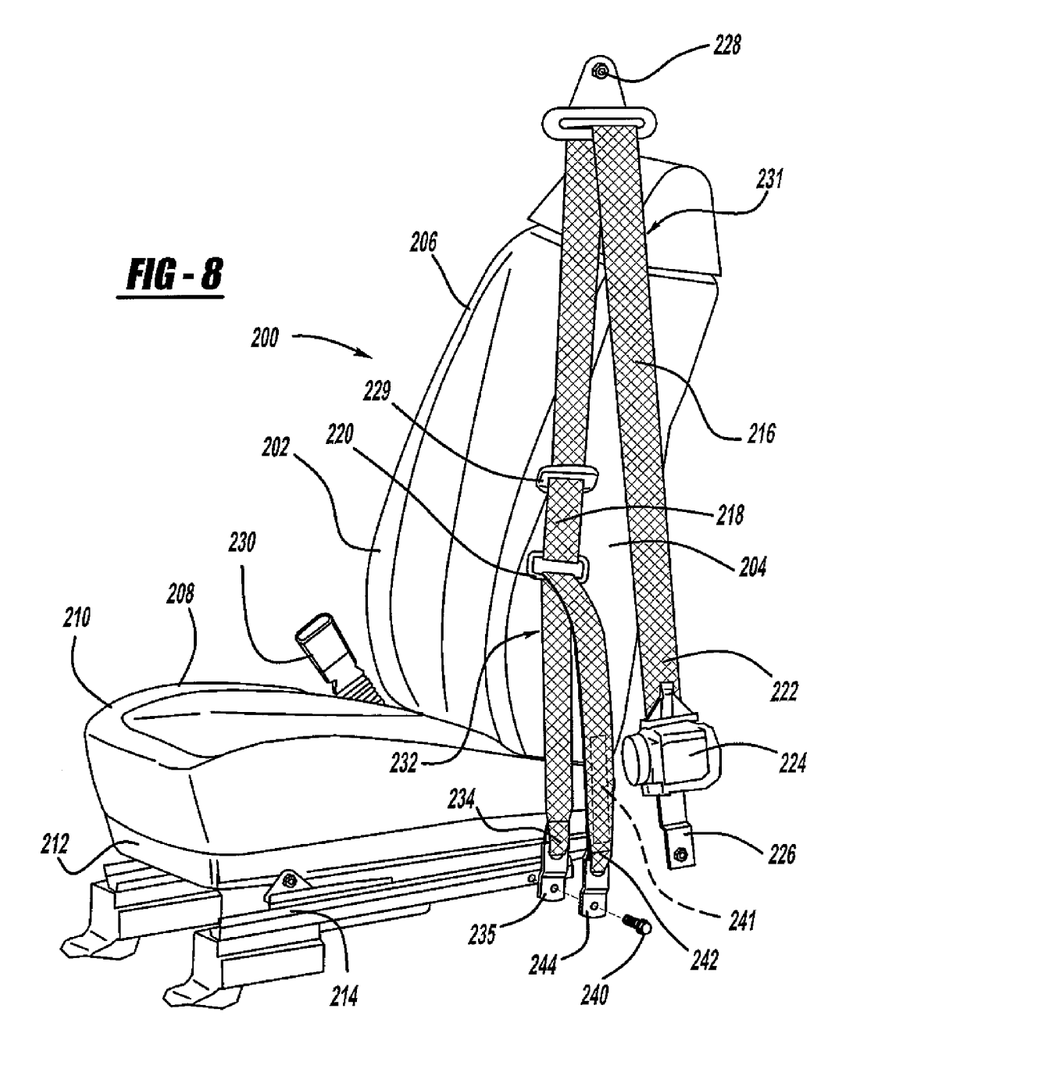
FIG. 8 illustrates a perspective view of the third embodiment of the serviceable seatbelt integrated airbag assembly of the disclosed invention in which the two ends of the lap belt portion are connected directly to the seat structure, frame or track assembly.
Figure 9:
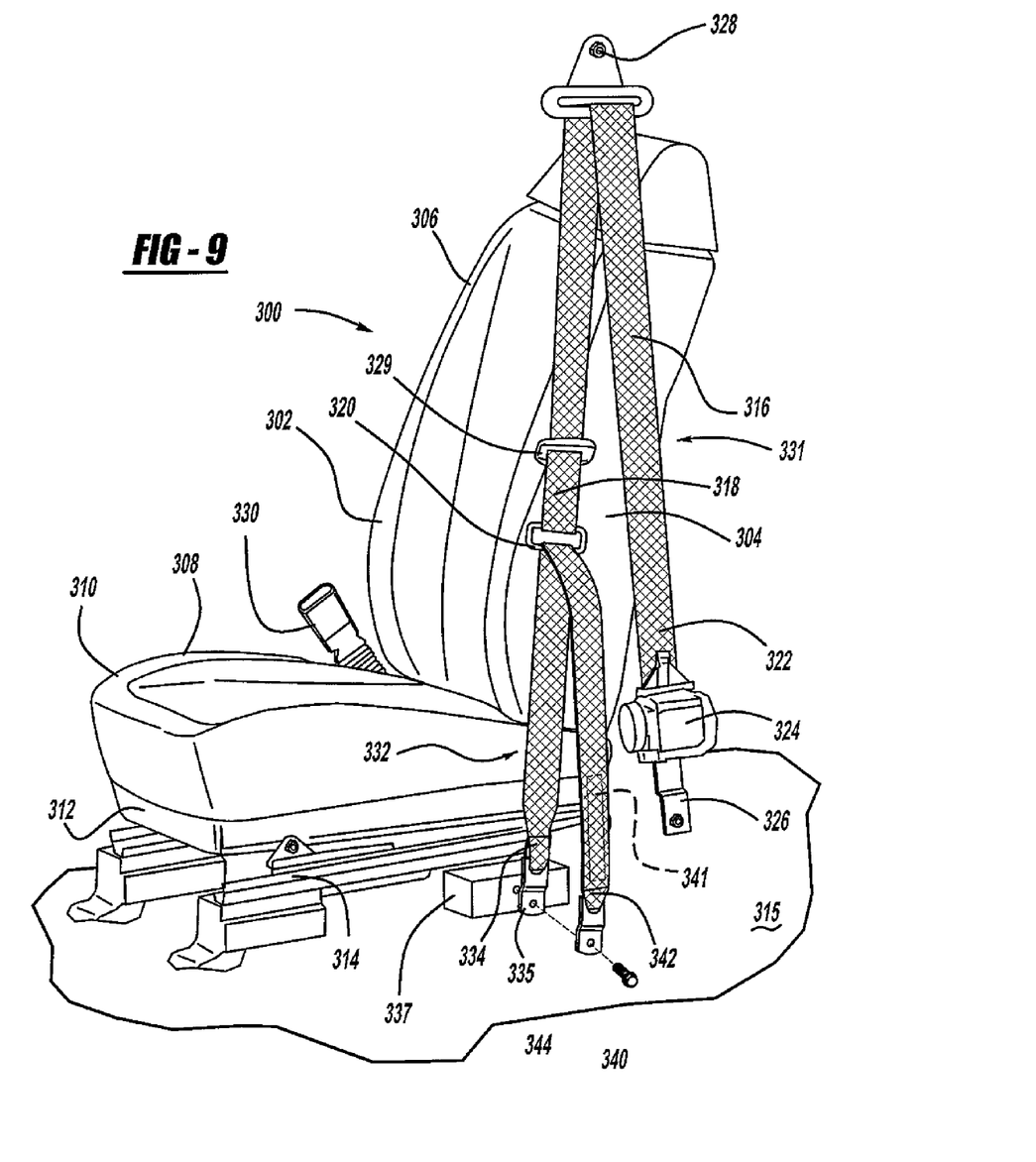
FIG. 9 illustrates a perspective view of the fourth embodiment of the serviceable seatbelt integrated airbag assembly of the disclosed invention in which the two ends of the lap belt portion are connected to a floor-mounted member in close proximity to the seat.

To overcome the inconvenience and expense of the procedures described in the preceding paragraph in order to remove and replace the combined seatbelt, d-ring, retractor assembly, seatbelt mounted belt tensioning device (if equipped), and its integral airbag and inflation device components, this invention provides an efficient and effective alternative to enable serviceability and replacement of the relevant portions of the seatbelt assembly, including the deployable cushion and inflation device content, independent from the remainder of the seatbelt assembly, d-ring, retractor assembly, seatbelt mounted belt tensioning device (as equipped) and mounting hardware, and visa-versa. Certain variations of the arrangement of the disclosed invention are shown in FIGS. 2 through 9. The first embodiment of the system of the disclosed invention is shown in FIGS. 2 through 5 and the second embodiment is shown in FIGS. 6 and 7. The third embodiment of the system of the disclosed invention is shown in FIG. 8. The fourth embodiment is shown in FIG. 9. It is to be understood that the illustrated first through fourth embodiments may be adapted and modified as required while still staying within the spirit and scope of the invention as explained and as claimed.

Figure 2:
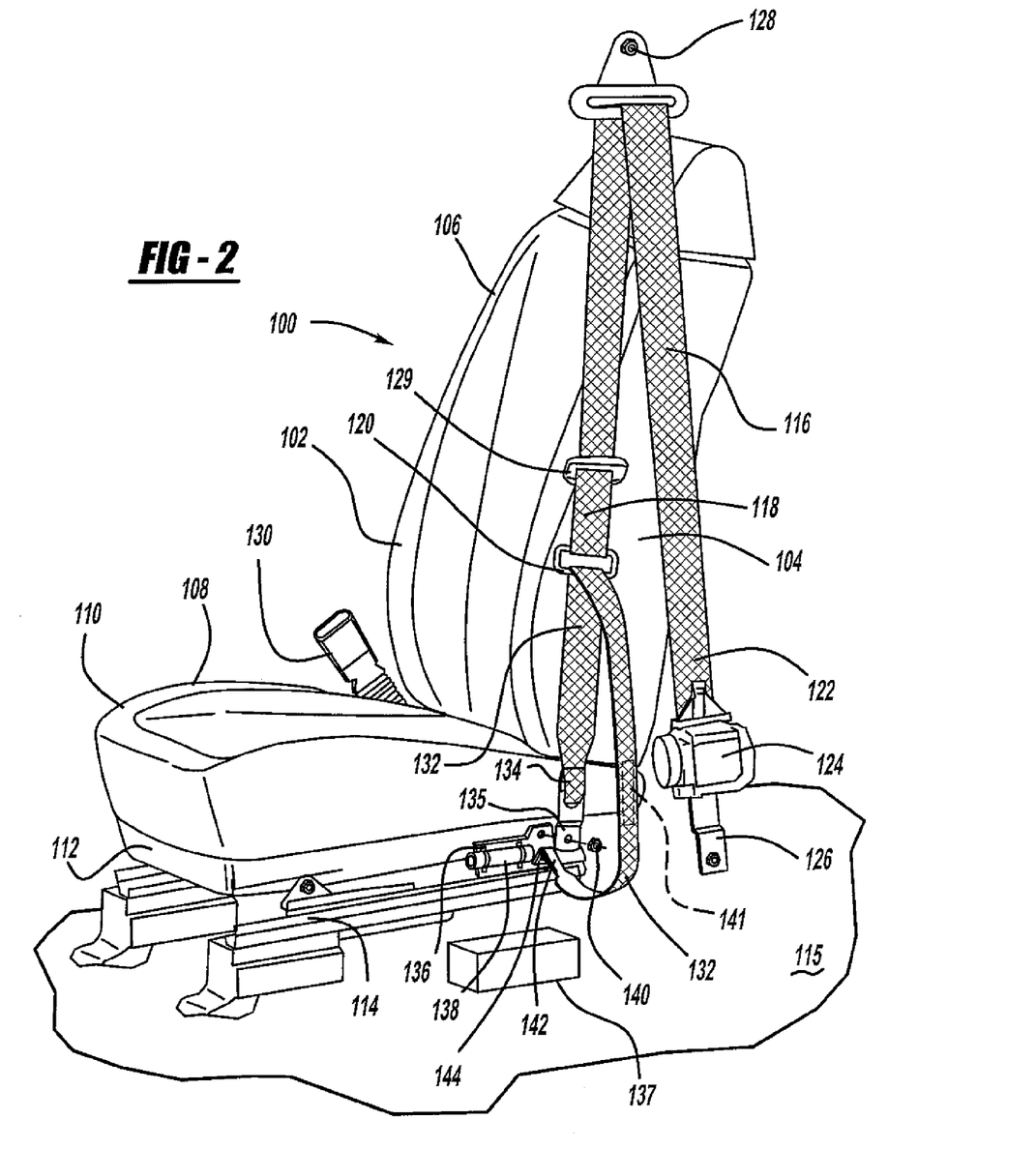
FIG. 2 illustrates a perspective view of a vehicle seat and seatbelt arrangement according to the first embodiment of the serviceable seatbelt integrated deployable cushion assembly of the disclosed invention in which a portion of the lap belt portion is shown looped through an interfacing joint element being attached to the primary seatbelt portion.
Figures 2A, 3:
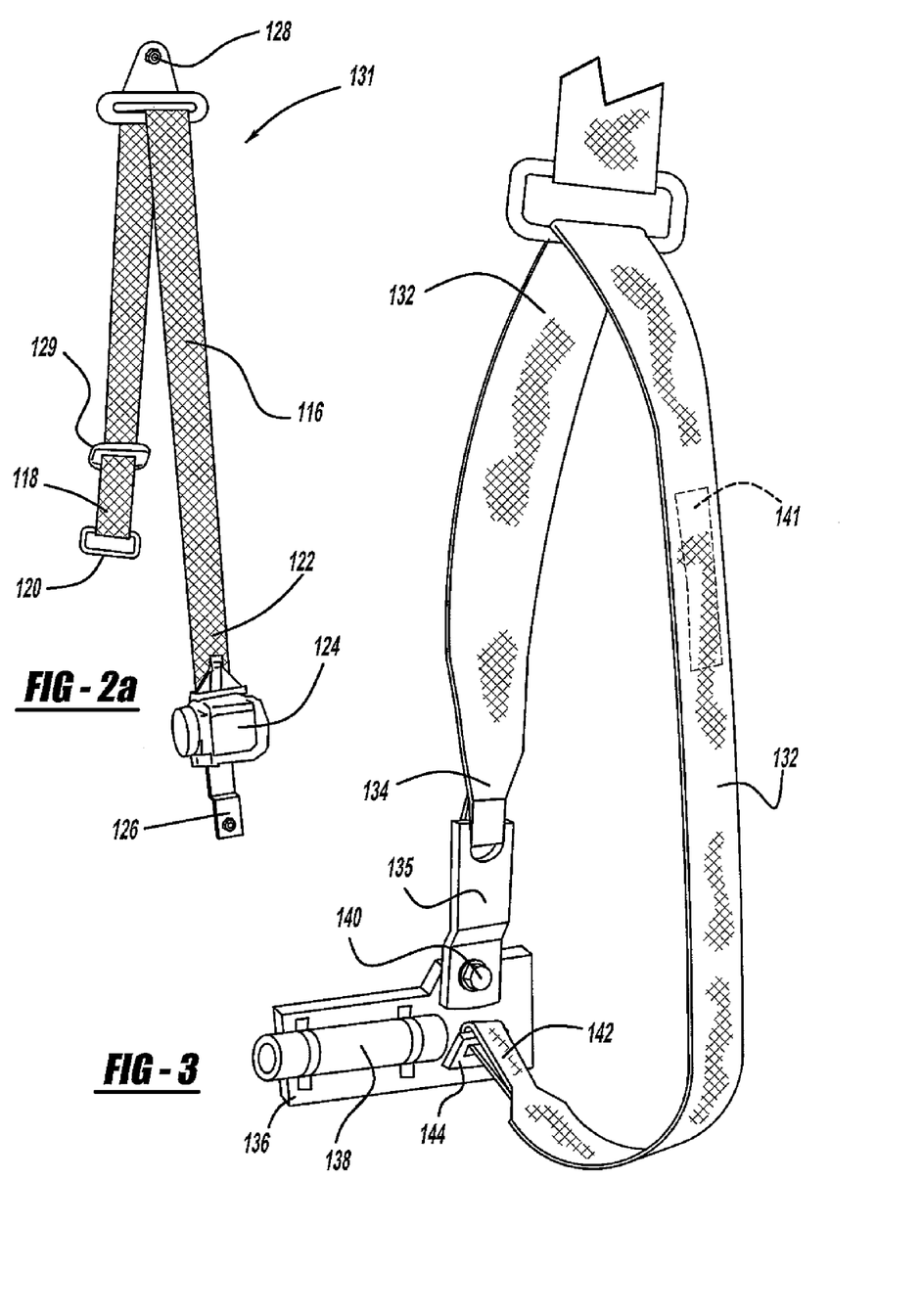
FIG. 2a illustrates a detailed view of the retractable seatbelt assembly of FIG. 2.
FIG. 3 illustrates a close-up view of the lap belt portion of FIG. 2, showing the lap belt portion routed through the interfacing joint element of the primary seatbelt portion with the free end of the lap belt portion having been secured to a bracket for attachment to a structural component of the seat assembly.

With reference to FIGS. 2, 2a and 3, a perspective view of a seat 100, is generally illustrated. The seat 100 includes an inboard side 102 (that is, a vehicle inward side), an outboard side 104 (that is, a vehicle outward side), a substantially upright seat back 106, and a substantially horizontal seat base 108. The seat base 108 includes an upper side 110 and a lower side 112. The lower side 112 generally rests on and is attached to a seat structure, frame or track assembly 114. The seat structure 114 rests on and is fastened directly or indirectly to a vehicle structure such as a vehicle floor 115. Alternatively, the lower side 112 may rest on and be attached directly to the vehicle floor 115 or similar structure in the vehicle (not shown).

Associated with the seat 100 is a retractable seatbelt webbing 116. The retractable seatbelt webbing 116 includes a first end 118 which is attached, by stitching, for example, to a load bearing interfacing joint element 120. It is to be noted that the configuration of the interfacing joint element 120 shown is only for illustrative purposes and is not intended as being limiting as other geometries, structural arrangements and attachment methods may be provided.

The retractable seatbelt webbing 116 includes a second end 122 which is operatively associated with a retractor assembly 124. Non-automotive or commercial vehicle configurations may be comprised of a second end 122 that is not operatively associated with a retractor assembly. The retractor assembly 124 is generally removably attached to a pillar, column, wall or similar structural member of the vehicle (not shown) by a fastener (not shown) engaging a bracket 126 that may be fixedly attached to the retractor assembly 124, or an extension of the retractor assembly 124. While not depicted in the figures, the retractor assembly 124 may be alternatively affixed directly to the seat 100, or attached to seat 100 through engagement with bracket 126, for example, in the case of seat integrated restraint (SIR) designs known in the art (not shown).

The retractable seatbelt webbing 116 is suspended by a d-ring (an upper seatbelt retaining bracket or guide) 128 that is removably attached to the interior structure of the vehicle by a fastener (not shown) at a point near the vehicle roof (not shown). Alternatively, in the case of an SIR seat, the d-ring may be an integral feature of the belt and retractor assembly or a component of the seat assembly itself (not shown).

Between the interfacing joint element 120 and the d-ring 128 is a tongue assembly 129 slidably provided on the retractable seatbelt webbing 116. In use, the tongue element of the tongue assembly 129 is releasably inserted into a buckle assembly 130. The buckle assembly 130 is removably attached to a load bearing member (not shown) of the seat 100 or to the vehicle floor 115 in a known manner. The retractable seatbelt webbing 116, the retractor assembly 124, the bracket 126, the interfacing joint element 120, the d-ring 128, and the tongue assembly 129 comprise a retractable seatbelt assembly 131.

Releasably connecting the retractable seatbelt webbing 116 generally to the seat structure 114 is a lap belt portion 132. FIG. 2 illustrates the lap belt portion 132 in the pre-fastened state while FIG. 3 illustrates the lap belt portion 132 in a fastened state.

The lap belt portion 132 includes an end 134 that is fixedly attached to a bracket 135. The bracket 135 may be attached to the seat structure in a variety of locations or may, as illustrated, be releasably attached to a mounting feature such as a removable bracket 136 which is itself removably attached to the seat structure 114 (or to a member 137 of the vehicle floor 115) by fasteners such as nuts, bolts or screws and the like. The end 134 may be attached to the bracket 135 by stitching or by an alternative method of permanent attachment. An airbag inflation device 138 is attached to the removable bracket 136 in a known manner, such as by a pair of attachment straps as illustrated. It is to be noted that the geometry of the bracket 135, the geometry of the removable bracket 136, and the method of attachment of the inflation device 138 may differ from that illustrated in FIGS. 2 and 3. It is to be further understood that while the airbag inflation device 138 is shown as being attached to the removable bracket 136, it may be placed in a variety of locations, including, for example, placement on the seat structure, adjacent to underneath or within the seat structure or may be attached to (or contained within) the seat belt webbing of lap belt portion 132. The bracket 135 is releasably attached to the removable bracket 136 by a fastener 140, such as a nut, bolt, screw, or the like. One or more fasteners 140 may be incorporated. The airbag inflation device 138 may be fluidly attached to a deployable cushion 141 (shown in broken lines) that is operatively associated with the lap belt portion 132. The airbag inflation device 138 is connected with the deployable cushion 141 in a known manner (not shown), whether remotely located and connected by fluid line, or directly connected to in the deployable cushion 141 in a configuration where the inflation device mounted in close proximity to, affixed to, or contained within, the seatbelt webbing of lap belt portion 132. In addition, the airbag inflation device 138 is connected to the vehicle's electrical system by a releasable conduit (not shown), also in a known manner.

The other end of the lap belt portion 132 is defined by a fixed end 142. The fixed end 142 is fixedly attached to the removable bracket 136 by an interfacing feature such as a web anchor 144. The profile of the web anchor 144 may be stamped into, and flared away from, the removable bracket 136 or the web anchor 144 may be a separate piece which is otherwise attached to the removable bracket 136, for example, by welding or in some other known way, to achieve permanent attachment thereto. The fixed end 142 is attached to the web anchor 144 by, for example, stitching or by some other method of permanent affixation as is known in the art. It is to be noted that the geometry of the web anchor 144 and its placement may be other than as illustrated in FIGS. 2 and 3.

FIG. 2 illustrates a partially assembled condition, depicting the bracket 135 and end portion 134 of lap belt portion 132 having been routed through the opening in the interfacing joint element 120 and positioned adjacent, but not yet attached to, the removable bracket 136. Fixed end 142 is shown attached to the removable bracket 136. An assembly cover (not shown) is generally fitted over the removable bracket 136, the airbag inflation device 138, and a portion of the lap belt portion 132.

In FIG. 3 the bracket 135 is shown fixed to the bracket 136 and the lap belt portion 132 is shown in more detail. It is to be understood that the deployable cushion 141 is illustrated as being of a given size in a given location. However, the deployable cushion 141 may be placed elsewhere on the lap belt portion 132 or may be of a different size and configuration from that shown. Alternative bracket engagement configurations (not shown) may include bracket 135 being configured to mount directly to a structural member of seat 100 with bracket 136 being affixed instead to bracket 135.

Removal of the lap belt portion 132, including the integrated deployable cushion 141, the bracket 136, and its associated inflation device 138 (as applicable) as a serviceable assembly may be accomplished readily. Removal, replacement and reinstallation of the serviceable assembly is thus simplified according to the various embodiments set forth herein.

To remove the seatbelt integrated airbag lap belt portion 132 of the restraint subsystem, the trim, shield(s), or cover(s) (not shown) are first removed. The inflation device 138 is disconnected from the electrical system of the vehicle. The fastener 140 is removed and the bracket 135 attached to end 134 of the lap belt portion 132 is passed through the interfacing joint element 120. Bracket 136 (and its associated inflation device 138, as applicable) attached to end 142 of the lap belt portion 132 may be removed from engagement with the seat 100 at this time, or after removal of any additional remaining attachment fasteners (not shown) that may be included for a particular implementation. Reattachment of the serviceable seatbelt integrated airbag assembly is accomplished by reversing the steps described above. The removal of the bracket 136 (and its associated inflation device 138, as applicable), the lap belt portion 132 (and its integrated deployable cushion 141) can be accomplished without the need for removing the retractable seatbelt webbing 116 (and its associated retractor assembly 124 and bracket 126), the d-ring 128 and related applicable interior trim. It should be understood that the sequences described above are for illustrative purposes only as the steps of the sequences may be rearranged.

Alternatively, in the event that any component of the retractable seatbelt assembly 131 requires removal or replacement, the fastener 140 would first be removed. Next, the bracket 135 of the lap belt portion 132 may be detached from engagement with the bracket 136 (and/or from engagement with the seat structure, if applicable in alternative configurations) and fed through the opening in the interfacing joint element 120. The retractable seatbelt assembly 131 may now be removed by first disengaging the fastener (not shown) that secures the d-ring 128 to the interior vehicle structure. Next, the interior trim (not shown) covering the second end 122, the retractor assembly 124, the bracket 126 and some portion of the retractable seatbelt webbing 116 may be removed. Once removed, detachment of the second end 122 may occur after disengaging the fastener (not shown) that secures the bracket 126 to the vehicle structure, thus freeing the retractable seatbelt assembly 131 from attachment to the vehicle. Similarly, for SIR seats, removal or detachment of relevant seat trim, seat shields, covers or plugs (not shown) necessary to gain access to the attaching hardware associated with retractable seatbelt assembly 131 would first be detached or removed, followed by disengaging the retractable seatbelt assembly 131 attachment fasteners. The retractor assembly 124, the bracket 136 (if included), the retractable seatbelt webbing 116, the seatbelt retaining guide that may be an integral feature of the retractor assembly or a component of the seat assembly may be detached as applicable to facilitate removal of retractable seatbelt assembly 131.

One variation of the first general embodiment of an arrangement for executing the concept of simple removal and installation of the serviceable assembly described above is illustrated in FIGS. 2 and 3 and has been discussed in conjunction therewith. Another variation of the first general embodiment is shown in FIGS. 4 through 5.

Figure 4:
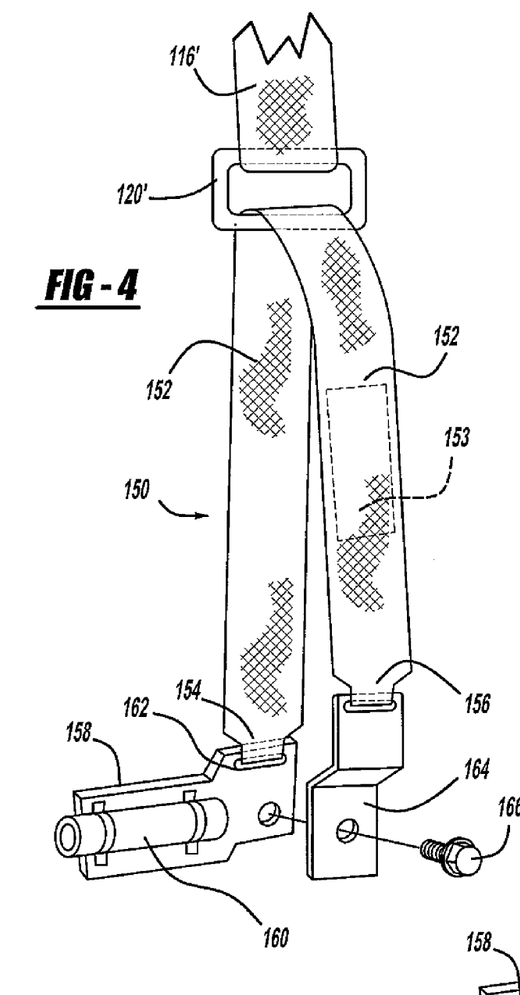
FIG. 4 illustrates a perspective view of a variation of the first embodiment of the serviceable seatbelt integrated deployable cushion assembly of the invention showing the attachable end of the lap belt portion in its pre-attached state.
Figure 5:
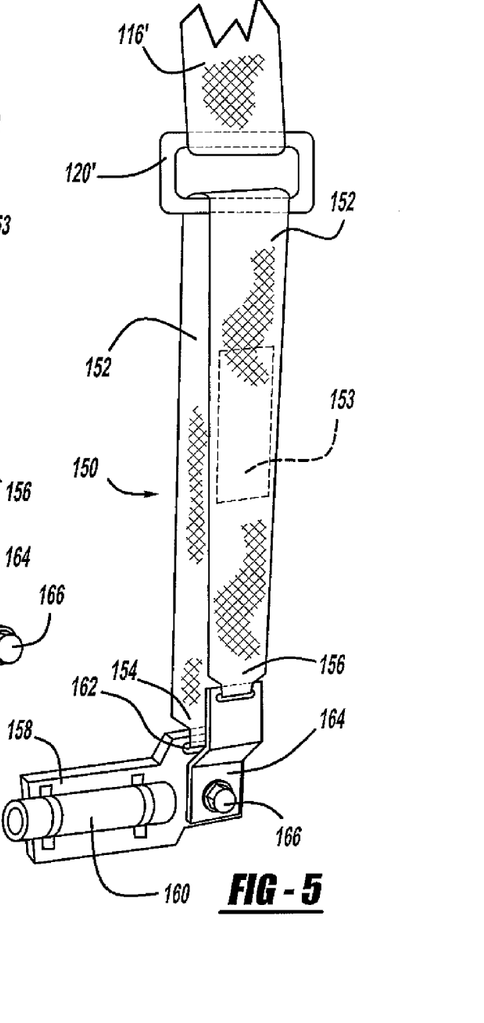
FIG. 5 illustrates a perspective view similar to that of FIG. 4, but demonstrates the attachable end of the lap belt portion in its attached state.
Figures 6, 7:
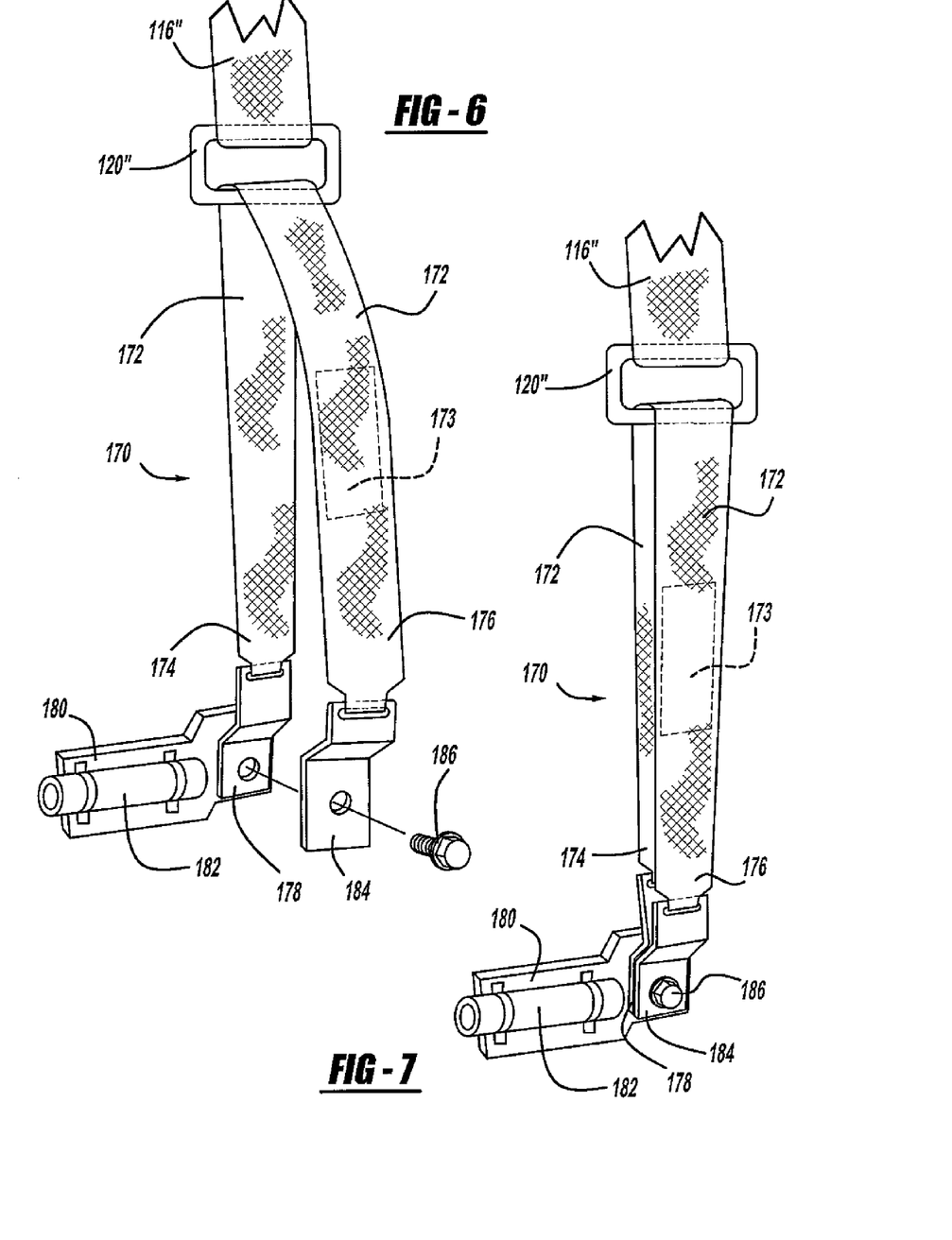
FIG. 6 illustrates a perspective view of the second embodiment of the serviceable seatbelt integrated airbag assembly of the disclosed invention showing the attachable ends of the lap belt portion in a detached state.
FIG. 7 is a view similar to that of FIG. 6, but illustrates the attachable ends of the lap belt portion in their attached states.

With reference to FIGS. 4 and 5, an alternate arrangement for facilitating simple, low cost removal and replacement of the decoupled serviceable assemblies is shown. The serviceable seatbelt integrated airbag assembly, generally illustrated as assembly 150, includes a lap belt portion 152 on or within which a removable deployable cushion 153 (shown in broken lines) may be positioned. The lap belt portion 152 is shown in relation to part of a retractable seatbelt webbing 116' and its associated interfacing joint element 120'. The lap belt portion 152 includes a first end 154 and a second end 156. The first end 154 is fixedly attached to a bracket 158 which may have an airbag inflation device 160 attached thereto. The bracket 158 may be removably attached to (as shown), rigidly fixed to, or an integral extension of, the seat structure, frame or track assembly or alternative structural component of the seat assembly that may be readily interchanged. It should be noted that the inflation device 160 and bracket 158 may alternatively be located in proximity to the orientations shown in the figures, such as underneath the seat maintaining similar attachment configurations and assembly and removal processes. It should also be noted that the geometry of the brackets 158 and 164 and the location of the deployable cushion 153 on the lap belt portion 152 may also vary from that illustrated in FIGS. 4 and 5.

A slot 162 is defined in the bracket 158. A portion of the first end 154 is passed through the slot 162 and is fixed by an attachment method such as stitching. The second end 156 is fixedly attached to a bracket 164, the bracket 164 also being a part of the serviceable seatbelt integrated airbag assembly 150. The bracket 164 is releasably engaged with the bracket 158 using a fastener 166. A cover (not shown) is provided and substantially covers the inflation device 160, the bracket 158 of the serviceable seatbelt integrated airbag assembly 150, and may additionally cover some or all of the fastener 166 and the first and second ends 154 and 156, respectively.

Removal of the serviceable seatbelt integrated airbag assembly 150 is accomplished by removing the cover side shield (not shown) from over the serviceable assembly 150 followed by disconnecting the airbag inflation device 160 from the vehicle's electrical system. The fastener 166 is removed from engagement with brackets 158 and 164, thus releasing the bracket 164 of the second end 156 from attachment to the bracket 158. The second end 156 (of the lap belt portion 152) and its associated bracket 164 is then passed through an interfacing joint element 120'. Reattachment of the serviceable assembly 150 is made by reversing the removal steps outlined above. It should be understood that the sequences described above are for illustrative purposes only as the steps of the sequences may be rearranged.

In the event that any of the retractable seatbelt webbing 116', its associated interfacing joint element 120' and the retractor assembly, the bracket, the d-ring, and the tongue assembly (these latter four elements being of the type illustrated in FIG. 2) require removal or replacement, the steps outlined above would be followed. Upon disengaging the serviceable seatbelt integrated airbag assembly 150 from connection with the interfacing joint element 120' of the retractable seatbelt webbing 116', the interfacing joint element 120', retractable seatbelt webbing 116', retractor assembly, bracket, d-ring, and tongue assembly may be removed after removing the necessary interior trim covers or shields and disengaging the appropriate vehicle interface connections, and may be subsequently reinstalled or replaced and reconnected to the serviceable seatbelt integrated airbag assembly 150, which is then reinstalled.

With reference to FIGS. 6 and 7, a second general embodiment of the disclosed invention for facilitating the easy removal and replacement of the serviceable seatbelt integrated airbag assembly is set forth. A serviceable assembly is illustrated generally as 170. The assembly 170 includes a lap belt portion 172 on, or within which, a deployable cushion 173 (shown in broken lines) may be positioned. The lap belt portion 172 includes a first end 174 and a second end 176. The lap belt portion 172 is shown in relation to a segment of a retractable seatbelt webbing 116" and its associated interfacing joint element 120". In practice, the relative size, shape and location of the deployable cushion 173 that is attached to, or contained within, the lap belt portion 172 may differ from the particular configuration depicted in FIG. 7.

A first attachment bracket 178 is fitted to the first end 174. The first attachment bracket 178 is also part of the serviceable seatbelt integrated airbag assembly 170. For attachment, the first attachment bracket 178 is generally positioned against a bracket 180. The bracket 180 may be removably attached to the seat structure (as shown), or may be rigidly fixed to, or an integral extension of, the seat structure, frame or track assembly (not shown) or alternative structural component of the seat assembly that may be readily interchanged. The bracket 180 may have an inflation device 182 attached thereto. Alternatively, bracket 178 may be attached directly to a structural member of the seat assembly. The inflation device 182 may be separately affixed to the seat assembly by way of bracket 180 or similar attachment feature (clamp, strap, or the like) causing the inflation device 182 to be located in close proximity to the first and second ends, 174 and 184, respectively. For convenience, the inflation device may be fluidly attached to the deployable cushion through an interface (not shown) the end of the seatbelt webbing nearest the location of the deployable cushion, for example end 176 in FIGS. 6 and 7.

A second attachment bracket 184 is fitted to the second end 176. The second bracket 184 is also part of the serviceable seatbelt integrated airbag assembly 170. The first bracket 178 and the second bracket 184 are releasably attached to the bracket 180 (or directly to a structural member of the seat assembly [not shown], if the inflation device is not affixed to bracket 180) by a removable fastener 186. This arrangement is shown in FIG. 6 in which the first bracket 178 and the second bracket 184 are shown prior to attachment to the bracket 180 by the removable fastener 186. The serviceable assembly 170 is shown in FIG. 7 with the first bracket 178 and the second bracket 184 fastened to the bracket 180 with the fastener 186. A cover (not shown) is generally provided and substantially covers the inflation device 182, and the bracket 180 of the seatbelt integrated airbag serviceable assembly 170 and may additionally cover some or all of fastener 186 and the first and second ends 178 and 184, respectively. It should be noted that the inflation device 182 may instead be affixed to or contained within, the seatbelt webbing of lap belt portion 172 in order to enable direct connection (not shown) with deployable cushion 173, or the inflation device 182 and bracket 180 may alternatively be located in proximity to the orientations shown in the figures, such as underneath the seat, while still maintaining similar attachment configurations and assembly and removal processes. It should also be noted that the geometry of brackets 178, 184 and 180 may also be other than as illustrated in FIGS. 6 and 7.

Removal of the serviceable seatbelt integrated airbag assembly 170 is achieved by first removing the side shield (not shown) from over the serviceable assembly 170. The electrical connection between the vehicle's electrical system and the airbag inflation device 182 is disconnected. The fastener 186 is then removed and the first bracket 178 and the second bracket 184 are released from engagement with the bracket 180. One or the other end of the lap belt portion 172 and its associated bracket is then passed through the interfacing joint element 120". The bracket 180 retaining the inflation device 182 may then be released from attachment to the seat structure. If the inflation device is alternatively mounted to the seat assembly, as referenced above, the mounting hardware would be disengaged in order to enable removal of the inflation device (if necessary) after decoupling any fluid attachments to the deployable cushion 173. Reattachment of the serviceable assembly 170 is achieved by reversing the preceding steps. It should be understood that the sequences described above are for illustrative purposes only as the steps of the sequences may be rearranged.

In the event that any of the retractable seatbelt webbing 116", its associated interfacing joint element 120" and the retractor assembly, the bracket, the d-ring, and the tongue assembly (these latter four elements being of the type illustrated in FIG. 2), require removal or replacement, the steps outlined above would be followed. Upon disengaging the serviceable seatbelt integrated airbag assembly 170 from connection with the interfacing joint element 120" of the retractable seatbelt webbing 116", the interfacing joint element 120", the retractable seatbelt webbing 116", the retractor assembly, the bracket, the d-ring, and the tongue assembly may be removed by disengaging the appropriate vehicle interface connections and may be subsequently reinstalled or replaced and reconnected to the serviceable seatbelt integrated airbag assembly 170 without replacing the assembly 170.

With reference to FIG. 8, a perspective view of the third embodiment of the serviceable seatbelt integrated airbag assembly of the disclosed invention in which the two ends of the lap belt portion are connected directly to the seat frame is illustrated. Particularly, a seat 200 is generally illustrated having an inboard side 202, an outboard side 204, a substantially upright seat back 206, and a substantially horizontal seat base 208. The seat base 208 includes an upper side 210 and a lower side 212. The lower side 212 generally rests on and is attached to a seat structure, frame or track assembly 214.

Associated with the seat 200 is a retractable seatbelt webbing 216. The retractable seatbelt webbing 216 includes a first end 218 which is attached by stitching, for example, to a load bearing interfacing joint element 220. It is to be noted that the configuration of the interfacing joint element 220 shown is only for illustrative purposes and is not intended as being limiting as other geometries, structural arrangements and attachment methods may be provided.

The retractable seatbelt webbing 216 includes a second end 222 which is operatively associated with a retractor assembly 224. Non-automotive or commercial vehicle configurations may be comprised of a second end 222 that is not operatively associated with a retractor assembly. The retractor assembly 224 is generally removably attached to a pillar, column, wall or similar structural member of the vehicle (not shown) by a fastener (not shown) engaging a bracket 226 that may be fixedly attached to the retractor assembly 224, or an extension of the retractor assembly 224. While not depicted in the figures, the retractor assembly 224 may be alternatively affixed directly to the seat 200, or attached to seat 200 through engagement with bracket 226, for example, in the case of seat integrated restraint (SIR) designs known in the art (not shown).

The retractable seatbelt webbing 216 is suspended by a d-ring (an upper seatbelt retaining bracket or guide) 228 that is removably attached to the interior structure of the vehicle by a fastener (not shown) at a point near the vehicle roof (not shown). Alternatively, in the case of an SIR seat, the d-ring 228 may be an integral feature of the belt and retractor assembly or a component of the seat assembly itself (not shown).

Between the interfacing joint element 220 and the d-ring 228 is a tongue assembly 229 slidably provided on the retractable seatbelt webbing 216. In use, the tongue element of the tongue assembly 229 is releasably inserted into a buckle assembly 230. The buckle assembly 230 is removably attached to a load bearing member (not shown) of the seat 200 or to the floor of the vehicle in a known manner. The retractable seatbelt webbing 216, the retractor assembly 224, the bracket 226, the interfacing joint element 220, the d-ring 228, and the tongue assembly 229 comprise a retractable seatbelt assembly 231.

Releasably connecting the retractable seatbelt webbing 216 generally to the seat structure 214 is a lap belt portion 232. FIG. 8 illustrates the lap belt portion 232 in the pre-fastened state.

The lap belt portion 232 includes an end 234 having a bracket 235 attached thereto. The end 234 may be attached to the bracket 235 by stitching or by an alternative method of permanent attachment. The other end of the lap belt portion 232 includes an end 242 having a bracket 244 attached thereto. The end 242 may be attached to the bracket 244 by stitching or by an alternative method of permanent attachment. The brackets 235 and 244 are fixedly attached to the seat structure, frame or track assembly 214 by a fastener 240 such as a nut, bolt, or screw and the like. One or more fasteners 240 may be used.

It should be understood that while FIG. 8 illustrates the brackets 235 and 244 as both being releasably attached to the seat structure, frame or track assembly 214 it is envisioned that an alternative to this approach, such as having a one or the other of the brackets 235 or 244 attached to the seat structure, frame or track assembly 214 and the other bracket attached to a removable bracket such as the removable bracket 136 shown in FIGS. 2 and 3 may be possible.

An airbag inflation device (not shown) may be attached to the seat structure, frame or track assembly 214 or may be placed in a variety of locations, including, for example, being placed adjacent to, underneath or within the seat structure or may be attached to (or contained within) the seat belt webbing of lap belt portion 232. The airbag inflation device may be fluidly attached to a deployable cushion 241 (shown in broken lines) that is operatively associated with the lap belt portion 232. The airbag inflation device is connected with the deployable cushion 241 in a known manner (not shown), whether remotely located and connected by fluid line, or directly connected to in the deployable cushion 241 in a configuration where the inflation device mounted in close proximity to, affixed to, or contained within, the seatbelt webbing of lap belt portion 232. In addition, the airbag inflation device is connected to the vehicle's electrical system by a releasable conduit (not shown), also in a known manner.

To remove the seatbelt integrated airbag lap belt portion 232 of the restraint subsystem, the trim, shield(s), or cover(s) (not shown) are first removed. The inflation device (not shown) is disconnected from the electrical system of the vehicle. The fastener 240 is removed and one or the other of the brackets 235 and 244 attached to ends 234 and 242, respectively, of the lap belt portion 232 is passed through the interfacing joint element 220. Reattachment of the serviceable seatbelt integrated airbag assembly is accomplished by reversing the steps described above. The removal of the inflation device, the lap belt portion 232 (and its integrated deployable cushion 241) can be accomplished without the need for removing the retractable seatbelt webbing 216 (and its associated retractor assembly 224 and bracket 226), the d-ring 228 and related applicable interior trim. It should be understood that the sequences described above are for illustrative purposes only as the steps of the sequences may be rearranged.

Alternatively, in the event that any component of the retractable seatbelt assembly 231 requires removal or replacement, the fastener 240 would first be removed, thus releasing the brackets 235 and 240 of the lap belt portion 232 from engagement with the seat structure, frame or track assembly 214. One or the other of the brackets 235 or 240 is then fed through the opening in the interfacing joint element 220. The retractable seatbelt assembly 231 may now be removed by first disengaging the fastener (not shown) that secures the d-ring 228 to the interior vehicle structure. Next, the interior trim (not shown) covering the second end 222, the retractor assembly 224, the bracket 226 and some portion of the retractable seatbelt webbing 216 may be removed. Once removed, detachment of the second end 222 may occur after disengaging the fastener (not shown) that secures the bracket 226 to the vehicle structure, thus freeing the retractable seatbelt assembly 231 from attachment to the vehicle. Similarly, for SIR seats, removal or detachment of relevant seat trim, seat shields, covers or plugs (not shown) necessary to gain access to the attaching hardware associated with retractable seatbelt assembly 231 would first be detached or removed. Retractable seatbelt assembly 231 attaching fasteners would be required. The retractor assembly 224, the retractable seatbelt webbing 216, and the seatbelt retaining guide that may be an integral feature of the retractor assembly or a component of the seat assembly may be detached as applicable to facilitate removal of retractable seatbelt assembly 231.

With reference to FIG. 9, a perspective view of the fourth embodiment of the serviceable seatbelt integrated airbag assembly of the disclosed invention in which the two ends of the lap belt portion are connected to a floor-mounted member in close proximity to the seat is illustrated. Alternatively, the two ends of the lap belt portion may be connected directly to the vehicle floor, to the vehicle side, or to a member mounted to the vehicle floor or side, as applicable for various seating configurations within a vehicle. Particularly, a seat 300 is generally illustrated having an inboard side 302, an outboard side 304, a substantially upright seat back 306, and a substantially horizontal seat base 308. The seat base 308 includes an upper side 310 and a lower side 312. The lower side 312 generally rests on and is attached to a seat structure, frame or track assembly 314. The seat structure, frame or tack assembly 314 rests on and is fastened directly or indirectly to a vehicle structure such as a vehicle floor 315. Alternatively, the lower side 312 may rest on and be attached directly to the floor pan or similar structure in the vehicle (not shown).

Associated with the seat 300 is a retractable seatbelt webbing 316. The retractable seatbelt webbing 316 includes a first end 318 which is attached by stitching, for example, to a load bearing interfacing joint element 320. It is to be noted that the configuration of the interfacing joint element 320 shown is only for illustrative purposes and is not intended as being limiting as other geometries, structural arrangements and attachment methods may be provided.

The retractable seatbelt webbing 316 includes a second end 322 which is operatively associated with a retractor assembly 324. Non-automotive or commercial vehicle configurations may be comprised of a second end 322 that is not operatively associated with a retractor assembly. The retractor assembly 324 is generally removably attached to a pillar, column, wall or similar structural member of the vehicle (not shown) by a fastener (not shown) engaging a bracket 326 that may be fixedly attached to the retractor assembly 324, or an extension of the retractor assembly 324. While not depicted in the figures, the retractor assembly 324 may be alternatively affixed directly to the seat 300, or attached to seat 300 through engagement with bracket 326, for example, in the case of seat integrated restraint (SIR) designs known in the art (not shown).

The retractable seatbelt webbing 316 is suspended by a d-ring (an upper seatbelt retaining bracket or guide) 328 that is removably attached to the interior structure of the vehicle by a method that is commonly known in the art. Alternatively, in the case of an SIR seat, the d-ring 328 may be an integral feature of the belt and retractor assembly or a component of the seat assembly itself (not shown).

Between the interfacing joint element 320 and the d-ring 328 is a tongue assembly 329 slidably provided on the retractable seatbelt webbing 316. In use, the tongue element of the tongue assembly 329 is releasably inserted into a buckle assembly 330. The buckle assembly 330 is removably attached to a load bearing member (not shown) of the seat 300 or to the floor 315 of the vehicle in a known manner. The retractable seatbelt webbing 316, the retractor assembly 324, the bracket 326, the interfacing joint element 320, the d-ring 328, and the tongue assembly 329 comprise a retractable seatbelt assembly 331.

Releasably connecting the retractable seatbelt webbing 316 generally to the seat structure 314 is a lap belt portion 332. FIG. 9 illustrates the lap belt portion 332 in the pre-fastened state.

The lap belt portion 332 includes an end 334 having a bracket 335 attached thereto. The end 334 may be attached to the bracket 335 by stitching or by an alternative method of permanent attachment. The other end of the lap belt portion 332 includes an end 342 having a bracket 344 attached thereto. The end 342 may be attached to the bracket 344 by stitching or by an alternative method of permanent attachment. The brackets 335 and 344 are fixedly attached to a member 337 of the vehicle floor 315. Attachment of the brackets 335 and 344 to member 337 is made by a fastener 340 such as a nut, bolt, or screw and the like. One or more fasteners 340 may be used.

It should be understood that while FIG. 9 illustrates the brackets 335 and 344 as both being releasably attached to the member 337 it is envisioned that an alternative to this approach, such as having a one or the other of the brackets 335 or 344 attached to the seat structure, frame or track assembly 314 or one or the other of the brackets 335 or 344 being attached to a removable bracket such as the removable bracket 136 shown in FIGS. 2 and 3 may be possible. Brackets 335 and 344 may also be releasably attached directly to a feature of the vehicle floor 115.

An airbag inflation device (not shown) may be attached to member 337 or may be placed in a variety of locations, including, for example, being placed adjacent to, underneath or within the seat structure or may be attached to (or contained within) the seat belt webbing of lap belt portion 332. The airbag inflation device may be fluidly attached to a deployable cushion 341 (shown in broken lines) that is operatively associated with the lap belt portion 332. The airbag inflation device is connected with the deployable cushion 341 in a known manner (not shown), whether remotely located and connected by fluid line, or directly connected to in the deployable cushion 341 in a configuration where the inflation device mounted in close proximity to, affixed to, or contained within, the seatbelt webbing of lap belt portion 332. In addition, the airbag inflation device is connected to the vehicle's electrical system by a releasable conduit (not shown), also in a known manner.

To remove the seatbelt integrated airbag lap belt portion 332 of the restraint subsystem, the trim, shield(s), or cover(s) (not shown) are first removed. The inflation device (not shown) is disconnected from the electrical system of the vehicle. The fastener 340 is removed and one or the other of the brackets 335 and 344 attached to ends 334 and 342 respectively of the lap belt portion 332 is passed through the interfacing joint element 320. Reattachment of the serviceable seatbelt integrated airbag assembly is accomplished by reversing the steps described above. The removal of the inflation device, the lap belt portion 332 (and its integrated deployable cushion 341) can be accomplished without the need for removing the retractable seatbelt webbing 316 (and its associated retractor assembly 324 and bracket 326), the d-ring 328 and related applicable interior trim. It should be understood that the sequences described above are for illustrative purposes only as the steps of the sequences may be rearranged.

Alternatively, in the event that any component of the retractable seatbelt assembly 331 requires removal or replacement, the fastener 340 would first be removed, thus releasing the brackets 335 and 344 of the lap belt portion 332 from engagement with member 337 of the vehicle floor 315. One or the other of the brackets 335 or 344 is then fed through the opening in the interfacing joint element 320. The retractable seatbelt assembly 331 may now be removed by first disengaging the fastener (not shown) that secures the d-ring 328 to the interior vehicle structure. Next, the interior trim (not shown) covering the second end 322, the retractor assembly 324, the bracket 326 and some portion of the retractable seatbelt webbing 316 may be removed. Once removed, detachment of the second end 322 may occur after disengaging the fastener (not shown) that secures the bracket 326 to the vehicle structure, thus freeing the retractable seatbelt assembly 331 from attachment to the vehicle. Similarly, for SIR seats, removal or detachment of relevant seat trim, seat shields, covers or plugs (not shown) necessary to gain access to the attaching hardware associated with retractable seatbelt assembly 331 would first be detached or removed. Retractable seatbelt assembly 331 attaching fasteners would be required. The retractor assembly 324, the retractable seatbelt webbing 316, and the seatbelt retaining guide that may be an integral feature of the retractor assembly or a component of the seat assembly may be detached as applicable to facilitate removal of retractable seatbelt assembly 331.

Thus described, the disclosed invention overcomes the limitations and difficulties of prior arrangements by providing a serviceable assembly which allows for independent removal and installation of both the seatbelt integrated airbag assembly and the primary portion of the seatbelt assembly, including upper seatbelt retaining bracket/guide, retractor assembly and related components. While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A vehicle restraint system comprising:
    a vehicle structure;
    a seat attached to said structure;
    a retractable seatbelt webbing having a first end and a second end;
    a joint attached to said first end of said webbing;
    a retractor to which said second end of said webbing is attached;
    a lap belt associated with said joint and being removably attached to said seat or said vehicle structure; and
    a deployable cushion integrated with said lap belt.

2. The restraint system of claim 1 which further includes a mounting feature associated with said one or the other of said seat and said vehicle structure and at least one releasable fastener, said first end of said lap belt being fixedly attached to said mounting feature, said second end of said lap belt being releasably attached to one or the other said mounting feature and a structural member of said seat by said at least one releasable fastener.

3. The restraint system of claim 2 further including a web anchor formed as part of said mounting feature, said first end of said lap belt being fixedly attached to said web anchor.

4. The restraint system of claim 2 wherein said mounting feature includes an upper portion and a lower portion, and wherein said first end of said lap belt is fixedly attached to said upper portion and said second end of said lap belt is removably attached to said lower portion by a removable fastener.

5. The restraint system of claim 2 wherein said mounting feature includes an upper portion and a lower portion, and wherein said first end of said lap belt is removably attached to said upper portion by a removable fastener and said second end of said lap belt is fixedly attached to said lower portion or to said seat.

6. The restraint system of claim 1 which further includes a mounting feature associated with said one or the other of said seat and said vehicle structure and at least one releasable fastener, at least one of said first end of said lap belt and said second end of said lap belt being releasably attached to said mounting feature by said at least one releasable fastener.

7. The restraint system of claim 1 wherein at least one of said first end of said lap belt and said second end of said lap belt is releasably attached to said seat, or to said vehicle structure by said at least one releasable fastener.

8. The restraint system of claim 1 which further includes a deployable cushion inflation device fluidly connected to said deployable cushion.

9. The restraint system of claim 1 which further includes a mounting feature removably attachable to said seat and a deployable cushion inflation device attached to said mounting feature, said deployable cushion inflation device being fluidly connected to said deployable cushion.

10. A deployable cushion and seatbelt assembly for use with a seat assembly being fixed to a vehicle structure and an operatively associated retractable seatbelt webbing, the retractable seatbelt webbing having a first end connected to a seatbelt interfacing joint element and a second end connected to a retractor, the assembly comprising:
a mounting feature operatively associated with one of the seat assembly or the vehicle structure;
a lap belt having a first end and a second end, at least one of said first end or said second end of said lap belt being releasably attachable to said mounting feature, a portion of said lap belt being operatively associated with the seatbelt interfacing joint element of the seatbelt assembly;
a releasable fastener and in which both said first end; and said second end of said lap belt are releasably attached to said mounting feature by said at least one releasable fastener.

11. The deployable cushion and seatbelt assembly of claim 10 which further includes at least one releasable fastener and in which the other of said first end or said second end of said lap belt is fixedly attached to said mounting feature by said releasable fastener.

12. The deployable cushion and seatbelt assembly of claim 11 further including a web anchor formed as part of said mounting feature, the fixedly attached end of said lap belt being fixedly attached to said web anchor.

13. The deployable cushion and seat assembly of claim 12 in which an aperture is formed in said web anchor, wherein a portion of said first end of said lap belt is positioned through said aperture.

14. The deployable cushion and seatbelt assembly of claim 10 further including a deployable cushion attached to said lap belt.

15. The deployable cushion and seatbelt assembly of claim 14 further including an airbag inflation device fluidly connected to the deployable cushion.

16. The deployable cushion and seatbelt assembly of claim 10 wherein said first end of said lap belt includes a first bracket and wherein said second end of said lap belt includes a second bracket, said first bracket having a profile and said second bracket having a profile, said profiles being at least partially matable.

17. A vehicle restraint system comprising:
a vehicle structure;
a seat attached to said structure;
a mounting feature attachable to said seat assembly or said structure;
a retractable seatbelt having an end;
a joint attached to said end of said retractable seatbelt webbing;
a lap belt associated with said joint and attached to said mounting feature;
a deployable cushion integrated with said lap belt; and
an inflation device fluidly connected with said deployable cushion.

18. The restraint system of claim 17 wherein said lap belt has a first end and a second end and wherein at least one of said first end or said second end is fixedly attached to said mounting feature.

19. The restraint system claim 17 wherein said lap belt has a first end and a second end and wherein at least one of said first end or said second end is releasably attached to said mounting feature.

* * * * *